United States Patent

[11] 3,575,115

| [72] | Inventor | Francois Louis Giraud<br>Plaisir, France |
|---|---|---|
| [21] | Appl. No. | 742,755 |
| [22] | Filed | July 5, 1968 |
| [45] | Patented | Apr. 13, 1971 |
| [73] | Assignee | Societe De L'"Aerotrain"<br>Paris, France |
| [32] | Priority | Oct. 4, 1967 |
| [33] | | France |
| [31] | | 123,279 |

[54] STABILIZING SYSTEM FOR A GROUND EFFECT MACHINE
10 Claims, 13 Drawing Figs.

[52] U.S. Cl. .................................................. 104/23,
104/120, 105/145
[51] Int. Cl. .................................................. B60v 1/04
[50] Field of Search .......................................... 104/23
(FS), 120; 105/145

[56] References Cited
UNITED STATES PATENTS

| 3,174,440 | 3/1965 | Cockerell .................. | 105/145X |
| 3,330,384 | 7/1967 | Bertin et al. ............... | 105/145X |
| 3,332,361 | 7/1967 | Bertin et al. ............... | 104/23(FS)X |

FOREIGN PATENTS

| 1,800,513 | 6/1969 | Germany .................... | 105/145 |

Primary Examiner—Joseph R. Leclair
Assistant Examiner—James R. Garrett
Attorney—Stevens, Davis, Miller & Mosher ABSTRACT: In a ground effect machine such as a vehicle travelling along a track with the interposition of sustaining and guiding cushions, the shifting of the machine out of its proper position with reference to the track is corrected not only by the fact that an increase in pressure in a cushion to one side of the machine and reduced leak on said side of the machine caused by the shifting towards said same side, produces a reduction in pressure of the cushion on the opposite side and consequently urges the machine back towards said opposite side, but to an increased extent when the objectionable shifting has reached a value above a predetermined threshold; this increased compensation is obtained by a mechanical or pneumatic connection between the cushions on the opposite sides of the machine, whereby the difference in pressure between the cushions is amplified.

STABILIZING SYSTEM FOR A GROUND EFFECT MACHINE

Ground effect machines are known which are guided along a track by cushions constituted by a compressed fluid. The track may be given the shape of an inverted T, the vehicle or the like machine being sustained by cushions engaging substantially horizontal surfaces of the track, while other cushions engage substantially vertical portions of the track, so as to guide the machine on either side thereof.

In the case of stresses exerted transversely with reference to the track axis, the returning force acting on the vehicle is obtained in particular as a consequence of the difference in pressure arising in the oppositely operating cushions by reason of the modification in opposite directions of the breadths of the leak gaps in the latter. Said difference in pressure is a function of the overall leak of the cushions under unvarying feed input conditions.

According to an embodiment of the present invention at least two oppositely operating cushions of the ground effect machine are laterally confined by means which are adjustable with reference to the machine frame, said confining means acting on each other through the agency of a mechanical, pneumatic or the like connection in a manner such that the shifting of the lateral confining means of one cushion with reference to the corresponding bearing surface of the track produces an increase of the correcting shifting in the reverse direction of the lateral confining means of the oppositely operating cushion. In other words, the difference between the leak gaps produced by the first shifting is enhanced and consequently the pressure is subjected to a greater variation in the oppositely operating cushion, which leads to an increase in the restoring force as compared with the natural stabilizing force of conventional ground effect machines.

It is of advantage to act both on the partitions which are substantially parallel with the track axis and on the partitions which are substantially perpendicular to said axis, which reduces on the one hand to a considerable extend the time required for stabilizing the machine and furthermore prevents any friction between the track and the confining partitions.

IN THE ACCOMPANYING DRAWINGS

FIG. 4 is a sectional view through line IV-IV of FIG 7 illustrating mechanical means interconnecting the confining partitions parallel with the track axis.

FIG. 6 is a partial sectional view through line VI-VI of FIG. 5.

Figure 1:
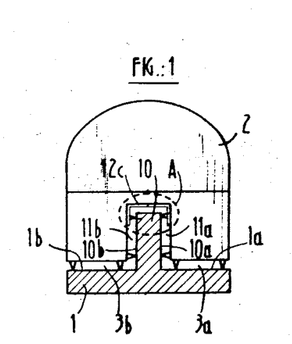
FIG. 1 is a diagrammatic transverse cross section of a movable ground effect machine associated with a sustaining and guiding track.

Turning to FIG. 1, there is illustrated a track 1 in the shape of an inverted T. Said track includes an axial rail 10 with two vertical surfaces 10a and 10b facing opposite directions and two lateral flanges the upper sustaining surfaces 1a and 1b of which are substantially horizontal. A movable machine 2, which is a vehicle in the example illustrated, cooperates with the track 1. It is carried above the latter by cushions 3a and 3b engaging the substantially horizontal upper surfaces 1a and 1b of the track flanges and it is furthermore guided by the cushions 11a and 11b engaging the opposite vertical surfaces 10a and 10b of the rail 10.

The different cushions of the machines are fed with fluid under pressure produced by a generator which is not illustrated.

Figure 2:
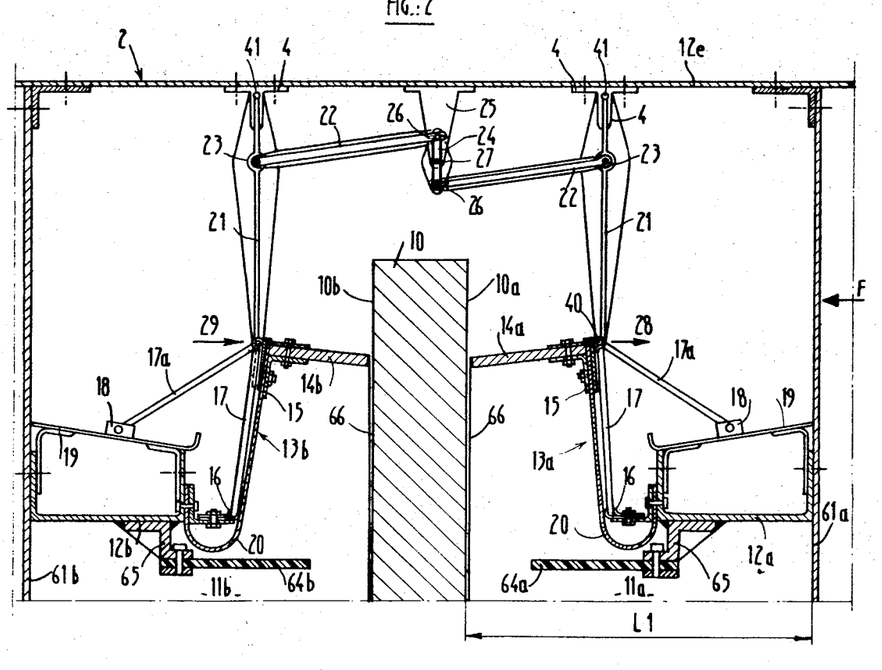
FIG. 2 illustrates on a larger scale the detail A of FIG. 1 which is shown in the latter within a dotted elliptic line.

As shown in FIG. 2, the guiding cushions 11a and 11b are confined within a bell-shaped chamber, the end walls of which 61a and 61b are rigid with the vehicle frame. The inner flanges 12a and 12b of said bell-shaped chambers are connected with the latter and extend so as to form two movable systems designated by the general reference numbers 13a and 13b.

Said systems include deformable flanges or partitions illustrated at 14a and 14b and secured to an angle bar 15 hingedly secured in 16 to a cranked rod 17—17a acting as a spring. The end 40 of said rod 17 carries, through the agency of an arm 17a, a shoe 18 engaging a plate 19 rigid with the vehicle frame, the arrangement including the shoe 18 and plate 19 forming frictionally operating damping means.

In order to reinforce the reliability of the arrangement, it may be of advantage to provide a second flange such as 64a 64b rigid with the flange 12a, 12b of the corresponding bell-shaped chamber as provided by means of an angle bar 65. Said flanges 64a, 64b are substantially shorter than the flanges 14a or 14b and their part consists in confining an auxiliary guiding cushion if for any fortuitous reason whatever a deformable system 13a or 13b is damaged. Said last-mentioned flange may also be sufficiently rigid so as to serve as an abutment for the machine.

A yielding diaphragm 20 connects the angle bar 15 with the flange 12a or 12b, so as to ensure thus the fluidtightness of the cushion without detrimentally acting on the freedom of movement of the movable systems.

The flanges 14a and 14b are coupled together, mechanically in the example illustrated, by means including two control arms 21 and two links 22. One end of each controlling arm is secured to the corresponding angle bar 15, while the other end is pivotally secured at 41 to a member 4 rigid with the wall 12e forming part of the frame of the movable machine. The links 22 are pivotally secured at 23 to the control arms 21 and they transmit their movement to a lever or a bell crank 24 rigid with a trunnion carried by a support 25.

It is of advantage to provide some clearance in the different pivotal connections of said coupling means, chiefly by providing for certain pivotal connections elongated slots, as illustrated at 26 for the links 22. In such a case, an elastic member 27 constituted by a spring urges the lever 24 into a predetermined position. Such an arrangement has for its result to allow the improved arrangement to become operative only beyond a certain threshold of required correction.

A relative shifting with reference to the track and transversely with reference to the latter, as provided for instance by a gust of wind the resulting force of which is illustrated by the arrow F or else by the centrifugal force arising when negotiating curves in the track, leads to a reduction in the spacing L1 measured between the end wall 61a of the bell-shaped member defining the cushion 11a and the substantially vertical surface 10a of the track 1. To restore the initial position of the vehicle with reference to the track, it is necessary to produce a force equal to the force F and the direction of which is opposed to the latter.

In a conventional arrangement including a bell-shaped chamber, wherein the cushion-confining means are stationary with reference to the movable machine frame, said returning force is obtained by reason of the fact that the force F which modifies the location of the vehicle with reference to the track reduces the breadth of the gap allowing fluid leaking out of the cushion 11a and increases correspondingly the breadth of the leak gap in the opposite cushion 11b. Consequently, the pressure in the cushion 11a increases while that in the cushion 11b decreases, the difference between the pressures in the cushions 11a and 11b producing a force opposing the force F, so that a natural self-stabilization is obtained.

The arrangement according to the invention allows increasing the difference in pressure between two oppositely operating cushions and to this end, it provides an amplification of said stabilizing effect beyond the result obtained with conventional bell-shaped chambers. It is therefore possible to reduce substantially the area of the bearing surface of the cushions which is required for obtaining a returning force equal to the force F and opposed to the latter.

The operation of the arrangement according to the invention is as follows:

By reason of a reduction in the spacing L1 ascribable to the action of the force F, the leak gap for the cushion 11a between the free edge of the flange 14a and the vertical surface 10a of the track decreases, while that of the cushion 11b increases by an equal amount. The pressure increases correspondingly inside the cushion 11a and drops inside the cushion 11b. The result is that the movable systems 13a and 13b are subjected to forces which are illustrated by arrows 28 and 29 and which urge them into rotation round the hinges 16.

Figure 3:
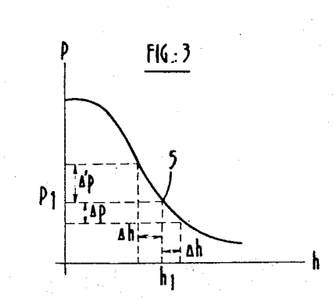
FIG. 3 is a graph showing the modification in pressure in a cushion as a function of the leak gap.

Turning now to FIG. 3 illustrating the variations in pressure P as a function of the leak level or daylight clearance h, it is apparent that the graph illustrating said variation is of the probability curve type. The normal point of operation is located at 5, which corresponds to a leak level $h\,1$ and to a pressure F1.

To an increase $\Delta h$ of the leak level, there corresponds a drop in pressure $\Delta p$ in the cushion, whereas to an equal reduction $\Delta h$ of the leak level, there corresponds an increase $\Delta'p$ of the pressure inside the cushion, which pressure increase change is larger than the drop $\Delta p$.

Consequently, the force illustrated by the arrow 28 acting on the system 13a is larger than the force illustrated by the arrow 29. The system 13a is thus shifted in the direction of the arrow 28 and the system 13b in the direction opposed to that of the arrow 29, so that the leak level in the cushion 11b is thereby increased. By reason of the large leak level appearing in the cushion 11b, the pressure drops considerably in the latter, while the force produced by the pressure inside the other cushion 11a increases, so as to restore the initial position of the movable machine.

The different stages of operation may be summarized as follows:

a relative shifting of the machine or vehicle in a direction F transversely of the track;

a shifting of the vertical wall 61a towards the bearing surface 10a of the track and a shifting of the opposite wall 61b away from the corresponding bearing surface 10b;

a reduction of the leak level underneath the flange 14a and an increase of the leak level underneath the other flange 14b;

an increase of the pressure inside the cushion 11a and simultaneously a reduction in the pressure in the opposite cushion 11b;

a rising of the system 13a which, by reason of the coupling disclosed, constrains the system 13b to rise also, whereas its natural tendency would be that of sinking.

a return to practically normal pressure inside the cushion 11a and to a value considerably below normal inside the cushion 11b. Said substantial difference in pressure between the cushions 11a and 11b restores the accurate position of the vehicle with reference to the track.

A shifting of a large amplitude of the vehicle requires an important modification in pressure in the cushions. However, for a displacement of small amplitude, it may be of interest to provide a range for which the movement of one movable system does not constrain the other system to move. This is possible if the coupling means become inoperative, for instance as provided by the elongated slots 26 in one of the pivotal connections of said coupling means, for a predetermined amplitude of shifting of one of the movable systems.

The cushions 11a and 11b shown on FIG. 4 are fed with compressed fluid through supply passages 110a and 110b. The lower flanges 12c and 12d defining the cushions extend also so as to carry two further movable systems 13c and 13d which are substantially identical with those illustrated at 13a and 13b.

Said systems 13c and 13d include deformable flanges 14c and 14d whereas flanges 64c, 64d are rigidly secured to the flanges 12c, 12d.

The flanges 14c and 14d are mechanically coupled through an arrangement similar to that connecting the flanges 14a and 14b in the embodiment illustrated in FIG. 2. The coupling means for the flanges 14c and 14b include two links 109 one end of which is pivotally secured to an elongated control arm 102 through the agency of a spindle 108, while its other end is secured to the angle bars 15. The two control arms are pivotally secured through the spindle 106 to the bearings 107 rigid with the machine body.

Said control arms impart their displacements through the intermediary of hinges 104 to links 103 which are pivoted in 105 to a bell crank 111, the latter being integral with a spindle carried by the support 25. Some clearance is advantageously provided in the different pivoting parts of the connecting assembly. The elastic member 27, for instance a spring, simultaneously holds fast both bell cranks 111 and 24. The object of the arrangement is to allow it to become operative only beyond a certain threshold of correction.

Figure 5:
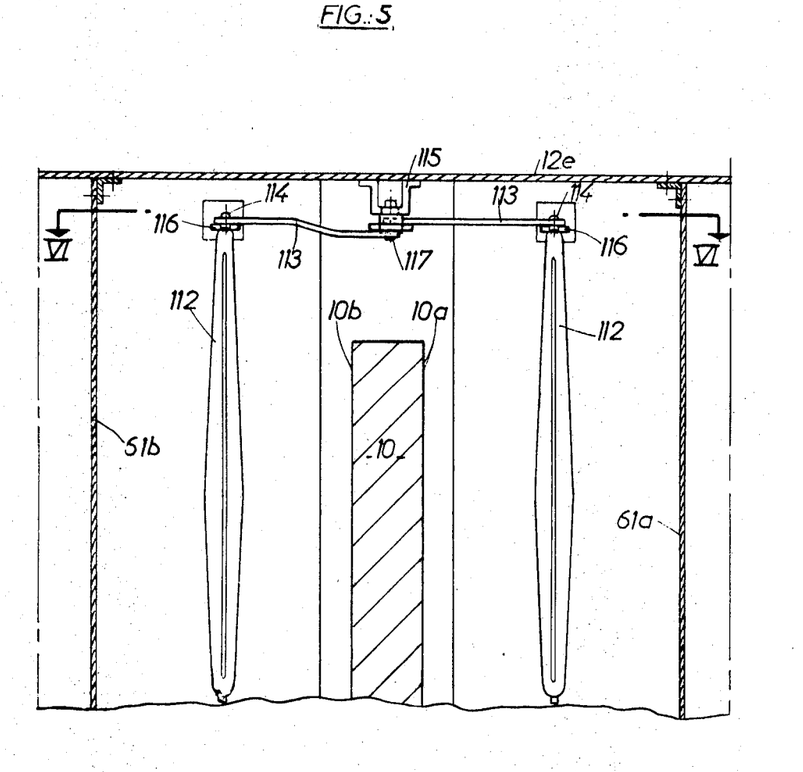
FIG. 5 is a partial sectional view illustrating the means interconnecting the confining partitions perpendicular to the track axis, the section line being shown at V-V of FIG. 6.

In planes parallel to the track axis flanges 14a, 14b, 14c, and 14d delimit the fluid cushions 11a and 11b. In planes perpendicular to said axis said cushions are limited by the flanges 123a, 123b and 123c, 123d, which are coupled by the connecting devices shown in FIGS. 5, 6 and 7.

As already explained for flanges 14a, 14b, 14c, and 14d, in relationship with FIG. 4 the flanges 123a, 123b as well as the flanges 123c, 123d (FIG. 6) are assembled to such systems as 121a, 121b and 121c, 121d which are of the same conception as the systems 13a, 13b and 13c, 13d aforedescribed in relation with FIG. 4. In order to augment security of the vehicle there are walls 137a, 137b which could eventually play the same part as the walls 64a, 64b, 64c and 64d of FIG. 4.

The mechanical arrangement controlling the flanges or partitions 123a, 123b includes two links 112 (FIGS. 5 and 6) each rigid at one end with angle bar 127 and pivotally fitted at the other end to a link 116 through the agency of a spindle 114. The links 116 are in their turn pivotally secured through their other ends to spindles 118 rigid with bearings 119. The latter are secured in their turn to transverse walls 120 integral with the machine frame, since they are connected with the sidewalls 61a or 61b through the angle bars 128. The links 116 transmit their movements to the links 113 which are pivotally secured on the one hand at 122 to said links 116 and on the other hand at 129 to a lever or bell crank 130 rigid with a trunnion 117 carried by a support 115 forming part of the wall 12e incorporated with the machine frame. It is also of advantage to provide a clearance in the various pivotal connections of said coupling means. An elastic member 131 constituted for instance by a spring holds fast the bell crank 130 and has for its object to allow operation of the arrangement only beyond a predetermined threshold.

Figures 7, 8:
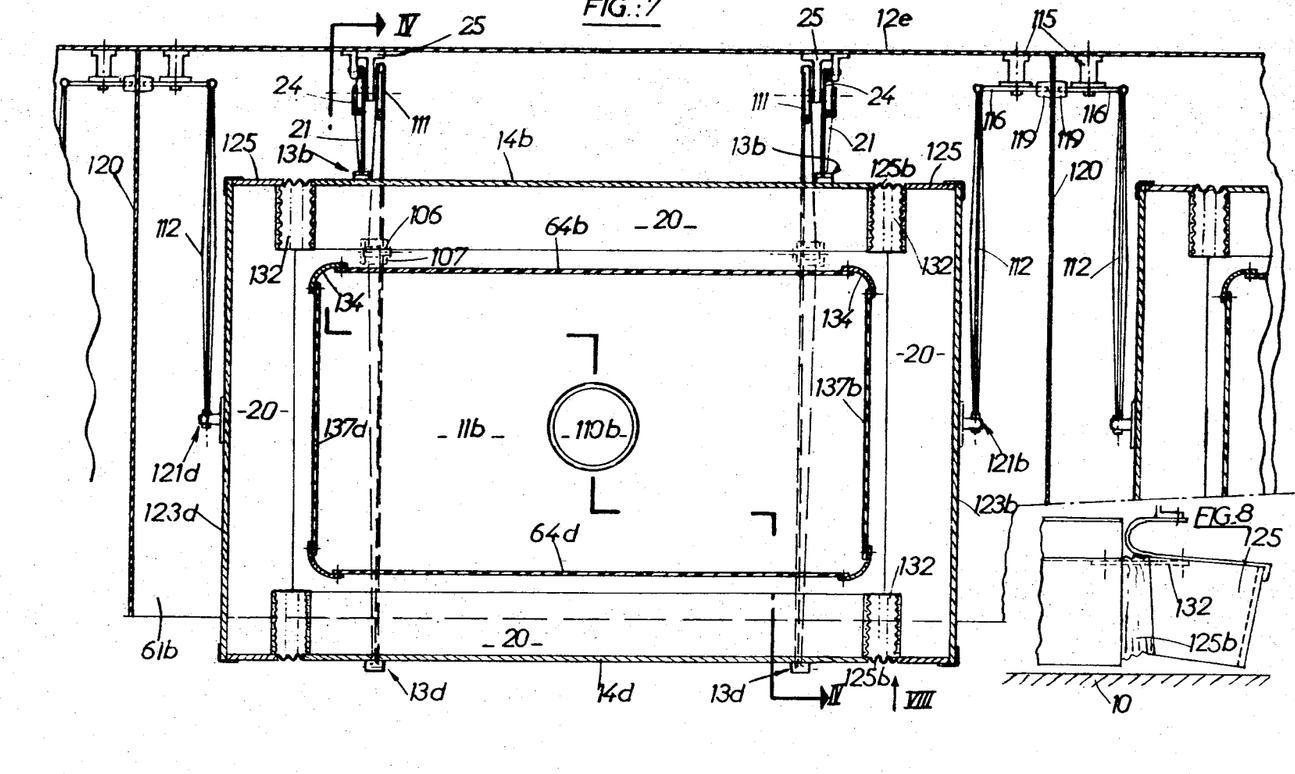
FIG. 7 is a diagrammatic sectional view through line VII-VII of FIG. 4.
FIG. 8 is a detail view of last-mentioned interconnecting means as seen in the direction of the arrow VIII of FIG. 7.

FIG. 7 is a diagrammatic view of the means controlling the flanges or partitions 14d, 14b, 123b, 123d defining the cushion 11b.

The flange or partition 14d is controlled by two movable systems 13d. The partition 14b is controlled by two systems 13b. The partition 123b is controlled by one system 121b, the partition 123c is controlled by a system 121d.

The connection between the partitions 14b and 14d and the partitions 123d and 123b is obtained as follows:

The flanges or partitions 123b and 123d extend into registry with the partitions 14b and 14d and are connected with the latter through the agency of a yielding diaphragm 125, rigidly secured through sewing or gluing or to the partitions 123b and 123d and of the bellows 126b connecting said yielding partition 125 with the partitions such as 14b or 14d by sewing or gluing, as illustrated in FIG. 8. The bellows further the rocking of the front and rear portions 123b and 123d. The lower section of the diaphragm 125 is cut off, so that it may move well away from the surface of the guiding rail 10 during the rocking movement of the partitions, whereby objectionable friction is avoided.

Yielding diaphragms 132 connect diaphragms such as 20 and are secured by sewing or gluing.

The operation of the embodiment of FIGS. 7 and 8 is basically the same as that of the previous embodiments.

Similarly, the sustaining cushions 3a and 3b (FIG. 1) engaging substantially horizontal surfaces 1a and 1b on the track 1 may be provided with means for raising the partitions or flanges which are substantially similar to what has been disclosed for the guiding cushions 11a and 11b. A pivotal movable system connects the outer longitudinal partitions on the one hand with the longitudinal partitions located in the vicinity of the medial rail upright on the other hand. The transverse partitions are interconnected in a similar manner.

If, for any fortuitous reason, the machine has a tendency to slope on one side and for instance the leak gap for one sustaining cushion is reduced, while that of the opposite cushion increases, the arrangement disclosed increases still more the leak gap for said opposite cushions and reduces that for the first cushion. This leads to a stabilizing action.

Figure 9:
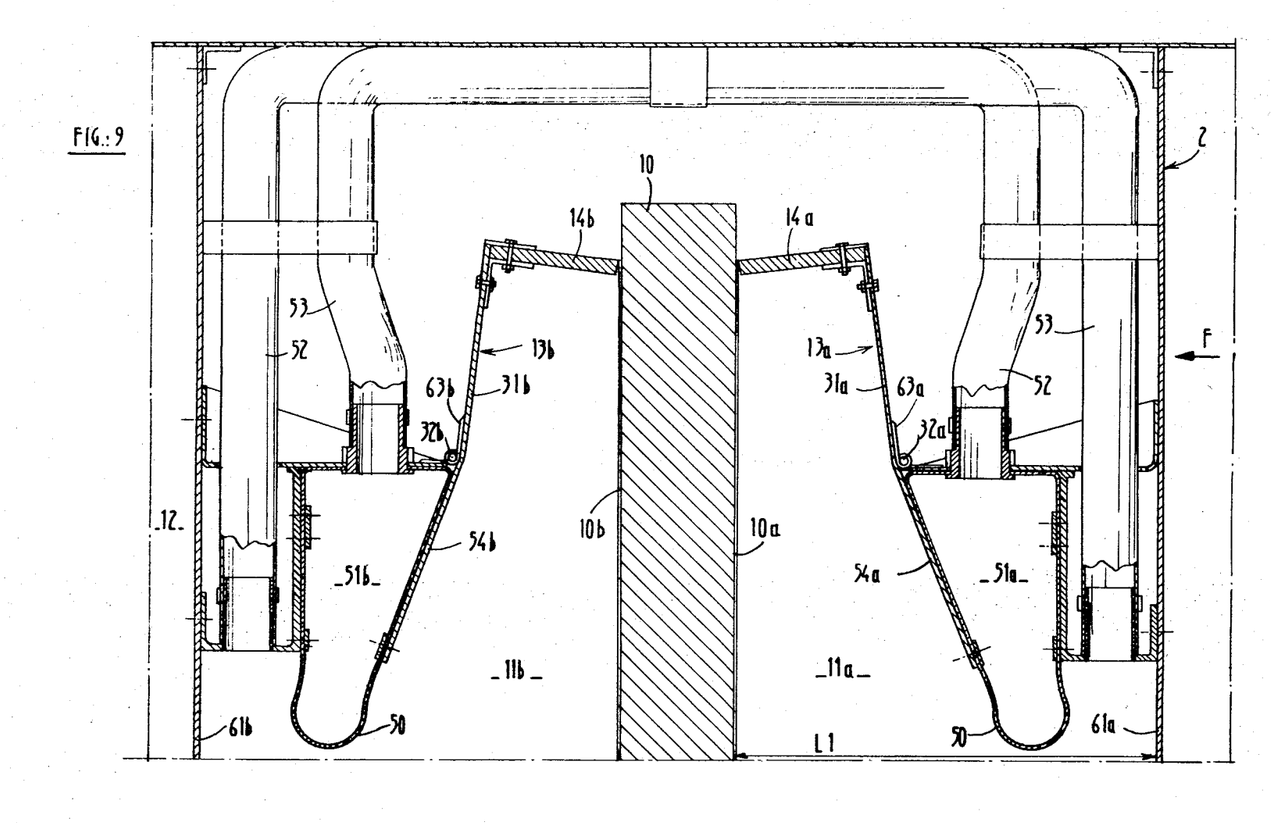
FIG. 9 illustrates a modified embodiment of the invention in partly cross-sectional view.

FIG. 9 illustrates a further embodiment wherein movable systems defining two opposite cushions are coupled under the action of compressed fluid.

The yielding flanges or partitions 14a and 14b are connected with the frame of the movable machine 2 by rigid partitions 31a and 31b pivotally secured to said machine frame at 32a and 32b. Said partitions extend beyond said pivotal connections 32a, 32b so as to form sections 54a, 54b bearing against a chamber 51a, 51b bounded by a fluidtight deformable diaphragm 50. The chamber 51a acting on the section 54a rigid with the partition 14a defining the cushion 11a is connected through a channel 52 with the cushion 11b. Similarly, the chamber 51b is connected with the cushion 11a through a channel 53. Elastic members constituted for instance by springs 63a, 63b which are possibly associated with damping means which are not illustrated act on the partitions 31a, 31b so as to balance the action of the pressure inside the cushion.

The operation of said arrangement is as follows:

A movement of the machine transversely with reference to the track under the action of a force F results in a reduction of the spacing L. The leak gap underneath the partition 14b is reduced, while that underneath the partition 14b increases, so that the pressure increases inside the cushion 11a and decreases in the cushion 11b.

The modifications in pressure inside the cushions 11a and 11b are transmitted to the chambers 51a and 51b respectively through the channels 53 and 52. The forces exerted to either side of the section 54b of the rigid partition forming an extension of the partition 14b are different since the pressure in the chamber 51b is equal to the pressure in the cushion 11a, which pressure in the case considered is assumed to be higher than the pressure in the cushion 11b. The rigid partition 31b pivots round the pivotal connection 32b and increases thereby the leak gap underneath the partition 14b. Similarly, the rigid partition 31a pivots round its pivotal connection 32a and reduces the leak gap underneath the partition 14a. This results in an increase in the difference between the pressures prevailing inside the cushions 11a and 11b and leads therefore to an increase in the returning force stabilizing the machine with reference to its track.

The different stages of operation may be summarized as follows:

a relative movement of the machine transversely with reference to the track in the direction of the arrow F;

a movement of the vertical wall of the machine 61a towards the bearing surface 10a formed by the vertical portion 10 of the track, while the opposite wall 61b moves away from the surface 10b of the track;

a reduction in the leak gap underneath the partition 14a and an increase in the leak gap underneath the other partition 14b;

an increase in the pressure in the cushion 11a and at the same time a reduction in pressure in the opposite cushion 11b;

the transmission of the increased pressure in the cushion 11a through the channel 53 into the chamber 51b which is deformed while conversely the chamber 51a empties into the channel 52;

the movable system 13a has a tendency to close and keep the cushion 11a under overpressure conditions, while the movable system 13b rises and causes the cushion 11b to empty this substantial difference in pressure between the cushions 11a and 11b returns the machine into its accurate position with reference to the track.

As in the preceding case, an increase in the leak throughput for the cushion 11b produces a machine-stabilizing force.

Figure 10:
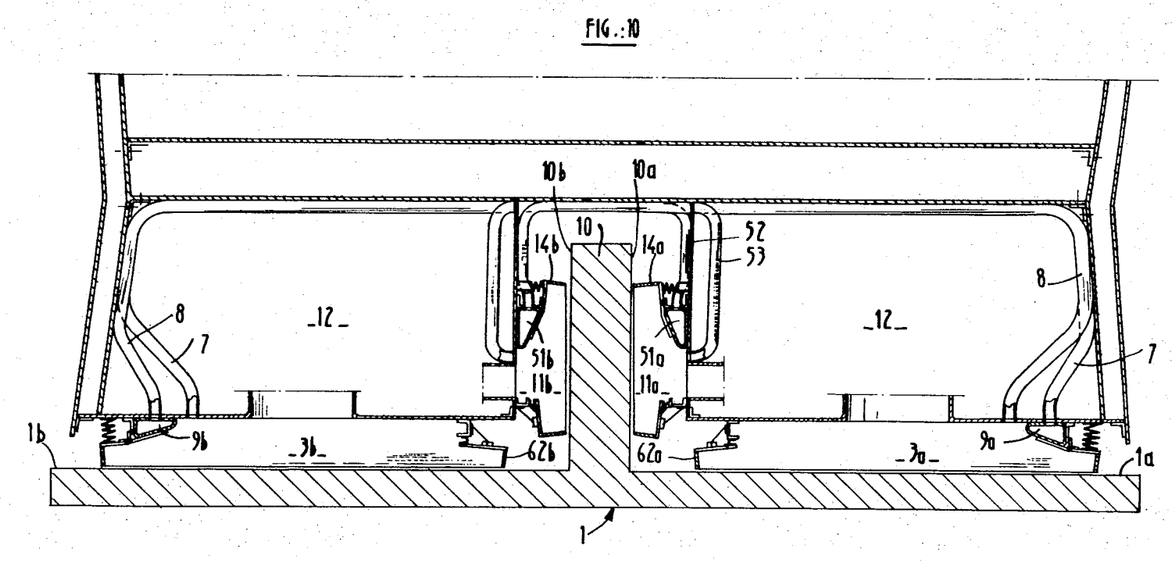
FIG. 10 illustrates similarly the application of the invention to the cushions sustaining a movable ground effect machine.

FIG. 10 is a partial sectional view showing the application of the arrangement illustrated in FIG. 9 to machine sustaining cushions.

The sustaining cushions 3a and 3b engaging the substantially horizontal surfaces 1a and 1b of the track are connected respectively through channels 8 and 7 with chambers 9b and 9a on which bear rigid partitions carrying the partitions 62b and 62a.

If for any fortuitous reason whatever the machine has a tendency to assume a slope on one side and for instance the leak gap of the cushion 3a is reduced, while that of the cushion 3b increases, the modifications in pressure in said cushions are transmitted through the channels 8 and 7 respectively to the chambers 9b and 9a, so that the leak gap for the cushion 3a has a tendency to be still further reduced, while that of the cushion 3b increases. This leads to a stabilizing action.

Figure 11:
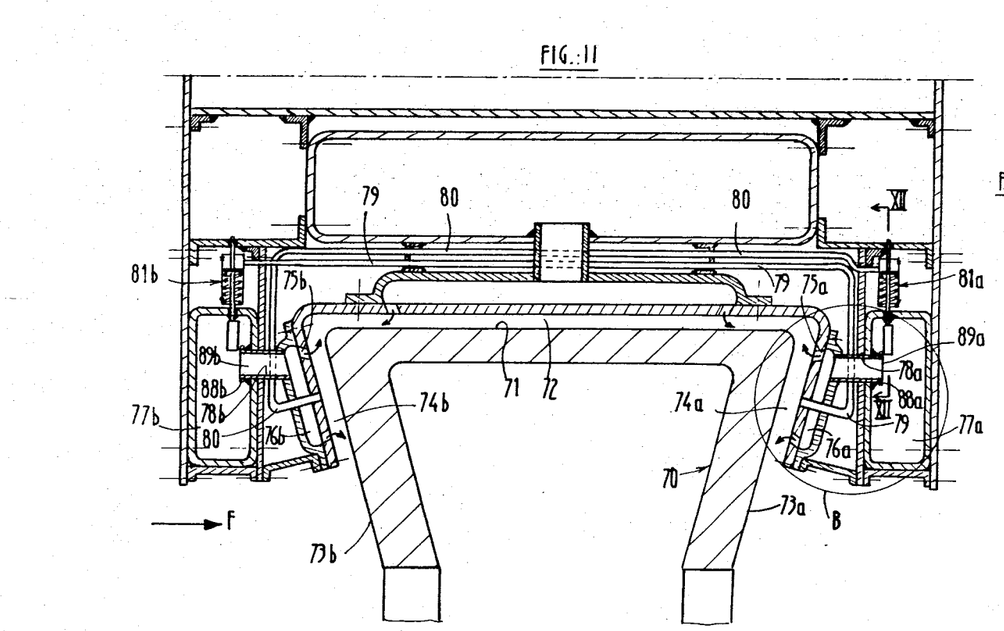
FIG. 11 illustrates cross-sectionally a further modified embodiment applied to a second type of track and of cushion-confining means.
Figure 12:
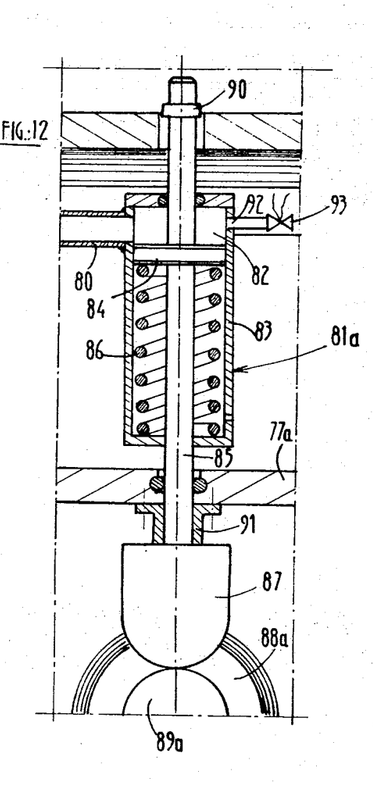
FIG. 12 is a cross section on an enlarged scale through line XII-XII of FIG. 11.

FIGS. 11 and 12 illustrate the application of the invention to a machine sustained and guided along a track by cushions of compressed fluid confined by fluid curtains.

In such an embodiment, the track 70 is of a substantially trapezoidal transverse outline, the larger base 71 of said track facing upwardly to form the bearing surface for the cushion 72 sustaining the machine, whereas the sloping sides 73a, 73b of said track serve as bearing surfaces for the cushions 74a and 74b guiding the machine. Said last-mentioned cushions are confined by fluid curtains produced by the nozzles 75a and 75b provided in the machine frame and fed through the chamber 76a and 76b formed in said frame and connected with headers 77a, 77b by channels 78a, 78b.

Said cushions may be constituted by the fluid serving for the production of curtains and/or by an injection of compressed fluid out of a port not illustrated provided in the machine frame.

The oppositely acting guiding cushions 74a and 74b are connected respectively through channels 79 and 80 with the jacks 81b and 81a.

FIG. 12 is a cross-sectional view of the jack 81a. The latter encloses an operative chamber 82 bounded between cylinder 83 and piston 84 carrying a rod 85. The channel 80 opens into said chamber so as to feed it with compressed fluid passing out of the cushion 74b and to urge downwardly piston 84 against the action of a spring 86.

To the end of the rod 85 entering the header 77a with the interposition of a fluidtight packing, there is rigidly secured a closing member 87 cooperating with the seat 88a formed at the end of the channel 78a, so as to close the input port 89a of said channel. Abutments 90 and 91 limit the path of said closing member.

As a modification, the stop 90 may be positioned in a manner such that the closing member 87 closes only partly the input port 89a of said channel. It is then possible to retain a small throughput feeding the confining curtains with fluid, which furthers the entire restoring of the curtains when the input port 89a is completely reopened.

Furthermore, a leak port 92 associated with a valve 93 which may be operated by a control station is provided inside the chamber 82.

The operation of said arrangement is as follows:

the pressure of each of the opposite cushions acts permanently on the surface of the jack piston associated with said cushion. If, as a consequence of the leaks provided by the valves 93, the said pressure is not sufficient for shifting the piston against the pressure of the spring 86, the cushions 74 are fed normally through the channels 78 connected with the headers 77. If, for any reason whatever, the machine is subjected to a lateral shifting of a somewhat considerable amplitude, the pressure inside one of said guiding cushion increases, say the cushion 74b if the machine has moved in the direction of the arrow F. If said pressure is sufficient for the force exerted by it on the piston of the jack 81a to be larger than the force exerted by the spring 86, then the piston and consequently its rod 85 and the closing member 87 are shifted so as to close the input port 89a for the channel 78a associated with the opposite cushion 74a; said cushion is thus fed in a restricted manner and a substantial difference in pressure is established between the two cushions 74a and 74b and consequently a stabilizing force appears, which returns the machine into its accurate position with reference to the track.

According to a modification corresponding to the case where the cushions are fed independently of the fluid curtains, it is possible to act on the throughput of the fluid feeding said cushions or else simultaneously on said feeding throughput and on the throughput of the fluid feeding said curtains.

Figure 13:
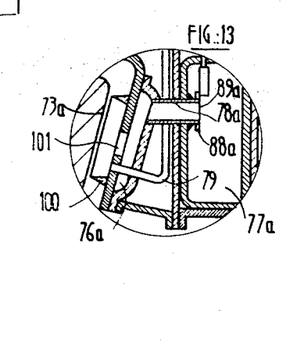
FIG. 13 illustrates a modification of the fraction of FIG. 11 defined by the circle B.

It is also possible to act on the flow of fluid feeding the cushions in the case of solid confining means being used such as a peripheral flange or packing 100 as illustrated in FIG. 13, the cushions being fed through the port 101 while the other arrangements illustrated in FIGS. 11 and 12 are retained.

I claim:

1. A surface effect machine having a structure movable along a bearing surface with the interposition of at least a first and a second pressure fluid cushions formed against said surface and mutually positioned to exert opposite moments on said structure, wherein the improvement comprises: a first and second cushion seal means of variable sealing effectiveness for peripherally confining said first and second cushions respectively and jointly displaceable respectively towards and away from said surface upon corresponding displacement of said structure relative thereto, whereby cushion pressure is correspondingly increased in said first cushion and decreased in said second cushion by respective pressure incremental increase and decrease, means responsive to said cushion pressure incremental increase in said first cushion, and sealing effectiveness varying means responsive to said pressure responsive means for reducing the effectiveness of the cushion seal means of said second cushion, whereby the pressure therein decreases further than said pressure incremental decrease thereof.

2. Surface effect machine as claimed in claim 1, wherein said first and second cushion seal means are further jointly displaceable respectively away from and towards said surface upon opposite corresponding displacement of said structure relative thereto, whereby cushion pressure is correspondingly decreased in said first cushion and increased in said second cushion by respective pressure incremental decrease and increase, said machine further comprising further means responsive to said cushion pressure incremental increase in said second cushion, and further sealing effectiveness varying means responsive to said further pressure responsive means for reducing the effectiveness of the cushion seal means of said first cushion, whereby the pressure therein decreases further than said pressure incremental decrease thereof.

3. Surface effect machine as claimed in claim 2, wherein said cushion seal means comprise curtain forming nozzle means fast with said structure, and means for supplying pressure fluid to said nozzle means to form cushion confining curtains issuing therefrom towards said bearing surface, and wherein said sealing effectiveness varying means comprise valve means for controlling said pressure fluid supply means.

4. Surface effect machine as claimed in claim 2, wherein said first and second cushion seal means, both said pressure responsive means, and both said sealing effectiveness varying means are respectively paired in substantially symmetrical mutual arrangement about a longitudinal plane of symmetry.

5. Surface effect machine as claimed in claim 4, wherein said bearing surface comprises a track for guiding said machine, said track being substantially symmetrical about said longitudinal plane of symmetry.

6. Surface effect machine as claimed in claim 2, wherein said cushion seal means comprise sidewalls of fluidtight solid material borne by said structure in adjustable relative position with respect thereto, and wherein said sealing effectiveness varying means comprise a mechanical linkage connected to said sidewalls for controlling the relative position thereof with respect to said structure.

7. Surface effect machine as claimed in claim 6, wherein said mechanical linkage comprises a rod and lever system interconnecting the sidewall of said first and second cushions.

8. Surface effect machine as claimed in claim 6, further comprising resilient means for urging said sidewall towards said bearing surface, and damping means cooperating with said resilient means for damping oscillations thereof.

9. Surface effect machine as claimed in claim 6, wherein said pressure responsive means comprise a deformable diaphragm exposed to cushion fluid pressure and actuating said mechanical linkage.

10. Surface effect machine as claimed in claim 6, wherein said pressure responsive means comprise a deformable pneumatic chamber actuating said mechanical linkage and extending into each of said cushions to be outwardly exposed to the pressure thereof, a pressure tap in each of said cushions, piping means connecting the tap in one cushion with the interior of the chamber in the other cushion, and further piping means connecting the other tap with the interior of the other chamber.